June 1, 1926.                L. K. LAURSEN                1,586,559
                              COUNTERSINK
                          Filed August 1, 1925

INVENTOR
L. K. Laursen
BY
Mitchell Bechtel
ATTORNEYS.

Patented June 1, 1926.

1,586,559

UNITED STATES PATENT OFFICE.

LAUST K. LAURSEN, OF COLLEGE STATION, TEXAS.

COUNTERSINK.

Application filed August 1, 1925. Serial No. 47,443.

My invention relates to a tool, and particularly to a countersink or the like.

In countersinks as ordinarily constructed, the cutting edges are arranged substantially in radial planes passing through the axis of the tool, and these cutting edges extending in such radial planes naturally tend to scrape the material, rather than to cut the same. The action is comparable to the cutting of a slice of bread from a loaf by pressing downwardly on the knife without any longitudinal movement of the blade. Such action tends to compress the bread or work article and tear or scrape the same, rather than to cut, so as to leave a relatively smooth surface.

It is the principal object of my invention to provide a tool, and particularly a countersink, with a cutting blade or edge so arranged that it will tend to cut, rather than scrape, the work.

Briefly stated, in the preferred form of my invention, which will be described as embodied in a countersink, I employ a body member having one or more blades or cutting edges thereon, which cutting edges may extend from the outer circumference toward or to the point of the tool. Each cutting edge is preferably curved in a circumferential direction, that is, the cutting edge extends spirally of the tool, so that a relatively smooth surface will be formed in the work.

In the drawings which show, for illustrative purposes only, preferred forms of the invention—

Figure 1:
Fig. 1 is a fragmentary view in side elevation of one form of countersink embodying the invention.
Figure 2:
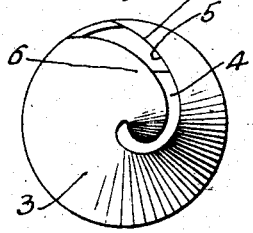
Fig. 2 is an end view of the countersink shown in Fig. 1.

In Figs. 1 and 2, 1 indicates what may be termed the body member of a countersink, the upper portion of which may be formed into a shank 2, the upper end (not shown) being provided with a part suitably formed for reception in a bit brace, drill press or the like. Since the particular conformation of the upper end of the shank forms no part of the invention, it has not been illustrated.

The lower portion of the body member is made in the desired shape, as indicated at 3, so as to form a countersunk hole of the requisite form. Obviously, this form may be truly conical, curved, or of other desired shape.

In the embodiment shown in Figs. 1 and 2, the lower portion 3 of the body member is provided with a curved slot 4, which extends spirally from adjacent the point upwardly. The edge 5 at one side of the slot projects slightly below the remainder of the surface 3 and is sharpened, so as to form an effective cutting edge. The opposite edge 6 adjacent the slot, together with the remainder of the lower portion 3 of the head, is consequently depressed relatively to the cutting edge 5. In this particular form the spiral extends outwardly in the direction of action, that is to say, the usual direction of rotation of a countersink is clockwise, as viewed from the top, or counterclockwise, as viewed from the bottom (Fig. 2). It has been found that this method of formation, that is, with the spiral extending in advance of a radial line of cut, is better adapted for cutting wood than when the spiral extends in the opposite direction.

While the lower portion 3 and the upper portion of the body of the tool have been shown as one piece, it is to be understood that in practice it may be desirable to form the lower part as a separate piece inserted in the body member 1. However, since this is merely a mechanical expedient, it is deemed unnecessary to specifically illustrate it.

Now, when this tool is in use, it will be plain that during rotation in a counterclockwise direction as viewed in Fig. 2, an outer portion, such as 7, of the cutting edge 5 will start to cut, and parts of the blade inwardly toward the point will successively reach the radial plane through what is now the point 7, and the cutting action of the entire blade 5 will thus be a true cutting action, and not a radial scraping action, as is the case with a countersink having a radial cutting, or what is usually a scraping, edge. It has been found that a hole formed with a countersink as shown in Figs. 1 and 2 will be very smooth and uniform on the inside, and the countersink is not likely to chatter about in the hole, as sometimes happens with countersinks having radial edges.

Figure 3:
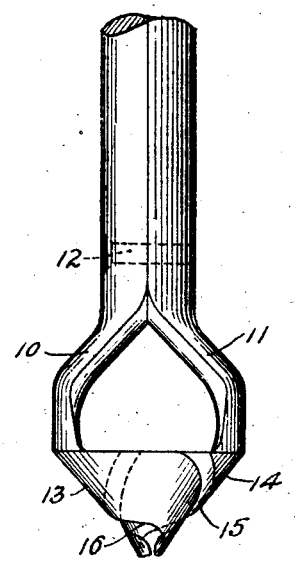
Figs. 3 and 4 are views similar to Figs. 1 and 2, respectively, and illustrating a modification.
Figure 4:
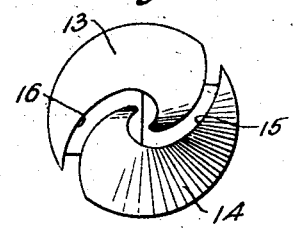

In the form shown in Figs. 3 and 4 I employ a body member formed in two halves 10—11, the shank portions of which may be secured together at one or more points, by means such as the screw 12. In this case, as in that previously described, the upper end of the shank is suitably shaped for reception in a bit brace or the like. Each half of the body member is preferably a substantial duplicate of the other, and the lower sides 13—14 are given the desired contour for countersinking a hole of the desired form. The lower part 14 is provided with a relatively sharp cutting edge 15, which, as in the previous case, extends spirally upwardly and outwardly from the lower end or point of the tool to the top of the part 14. The blade 13 is provided with a cutting edge 16, preferably a duplicate of the edge 15, and therefore also extending spirally of the body member. Those portions of the blades 13—14 extending rearwardly of the cutting edges 15—16 are depressed so as to permit the cutting edges to extend off slightly from the main conical surface of the lower end of the countersink, so that the cutting edges may bite into the work. The action in this form of the invention is substantially the same as that described in connection with Figs. 1 and 2, but a countersink having a plurality of cutting edges ordinarily will be better balanced and will cut faster than one having only a single cutting edge. The parts 10—11 may be separated from each other for sharpening the cutting edges.

Figure 5:
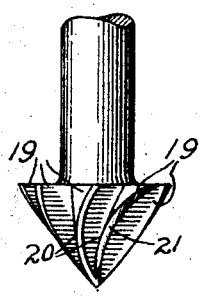
Figs. 5 and 6 are views similar to Figs. 1 and 2, respectively, and illustrating a further modification.
Figure 6:
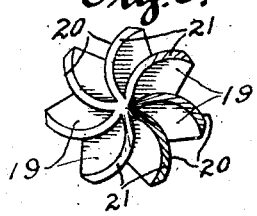

The countersink illustrated in Figs. 5 and 6 is particularly adapted for cutting metal, as distinguished from wood, for which the first two forms are particularly adapted. As shown in Figs. 5 and 6, the countersink is of the rose-head type, in which there are a considerable number of wings or blades 19—19, having cutting edges 20—20 thereon. These blades are preferably curved circumferentially of the countersink, but in this form it will be observed that the curve or spiral extends oppositely to that shown in Figs. 1 to 4, that is, the outer end of the cutting edge extends rearwardly of the cutting edge at the point of the tool. It has been found in practice that this form is better adapted for use with metals. Each blade 19 is relieved just in rear of the cutting edge 20, as indicated at 21—21, so as to cause the cutting edges 20—20 to project into position to bite into the work.

In all of the forms it will be apparent that material is removed from the work piece by a shearing or cutting action, and not by a scraping action, as is done with other similar tools with which I am familiar.

While the invention has been described as applied to a countersink, it is to be observed that the principles of the invention have a wider application and may be embodied in other tools, particularly those used in wood-working.

Various modifications may be made within the scope of the invention as defined in the appended claims.

I claim:

1. In a countersink, a shank having a hollow head portion at the lower end, the bottom of said hollow head being of relatively thin metal and having a spiral slot therein bounded by a forwardly inclined spiral cutting edge at one side thereof and the opposed side of the slot forwardly of said cutting edge forming a gaging surface, the slot permitting shavings to enter said hollow head and be removed from the cutting zone.

2. In a countersink, a hollow head formed in two parts secured together, each part having two forwardly inclined spiral edges at the lower side, one of said spiral edges on each part being a cutting edge, the spiral edges on one part being slightly spaced from adjacent spiral edges on the other part so as to leave a spiral opening to permit shavings cut by said spiral cutting edges to enter said hollow head and be removed from the cutting zone, a portion of each of said two parts extending forwardly of the cutting edges on the adjacent parts being depressed to form gaging surfaces to determine the depth of cut made by said spiral cutting edges.

LAUST K. LAURSEN.